J. F. JOHNSTON.
TRIMMING DEVICE.
APPLICATION FILED MAY 4, 1914.
1,121,924.
Patented Dec. 22, 1914.
2 SHEETS—SHEET 1.
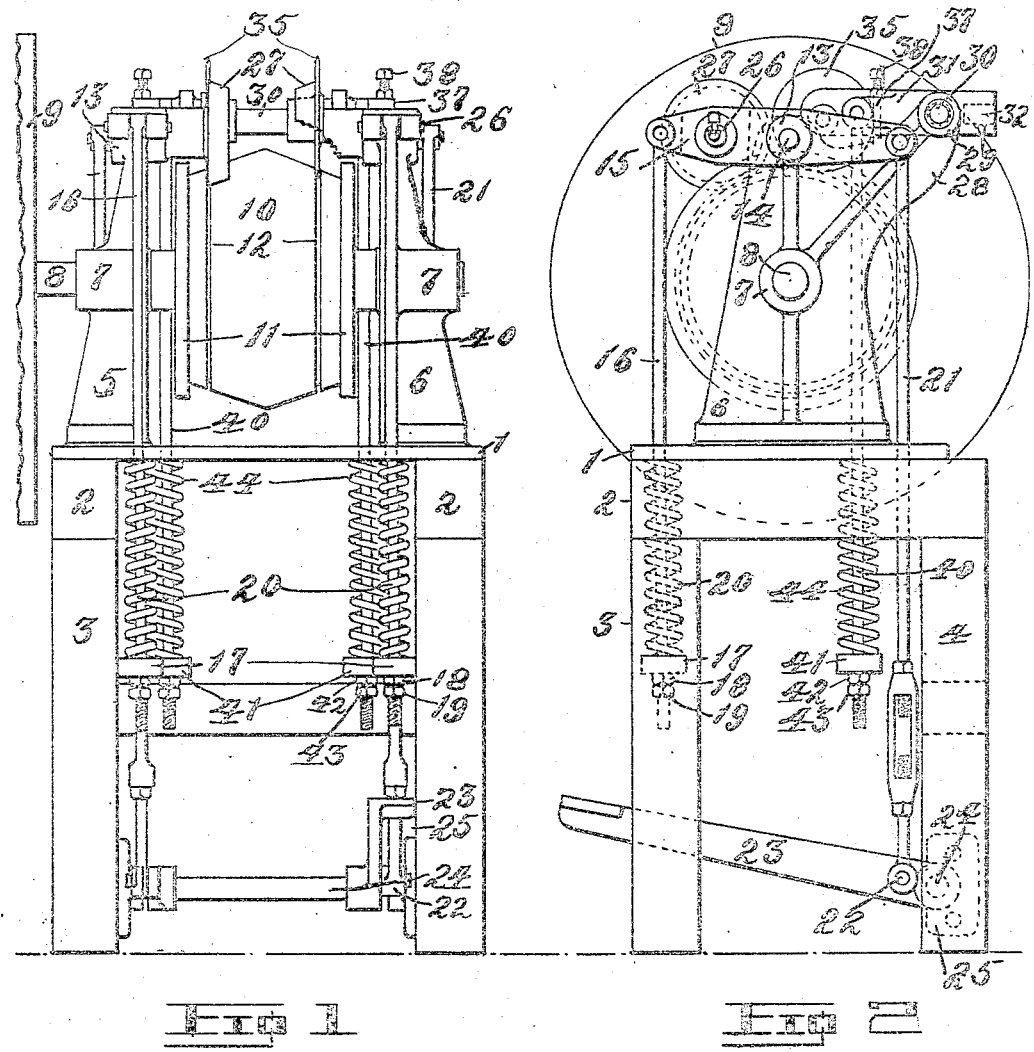
Witnesses
Jas. L. Butler.
G. L. McClintock
Inventor
John F. Johnston
C. E. Humphrey
By
Attorney J. F. JOHNSTON.
TRIMMING DEVICE.
APPLICATION FILED MAY 4, 1914.
1,121,924.
Patented Dec. 22, 1914.
2 SHEETS—SHEET 2.
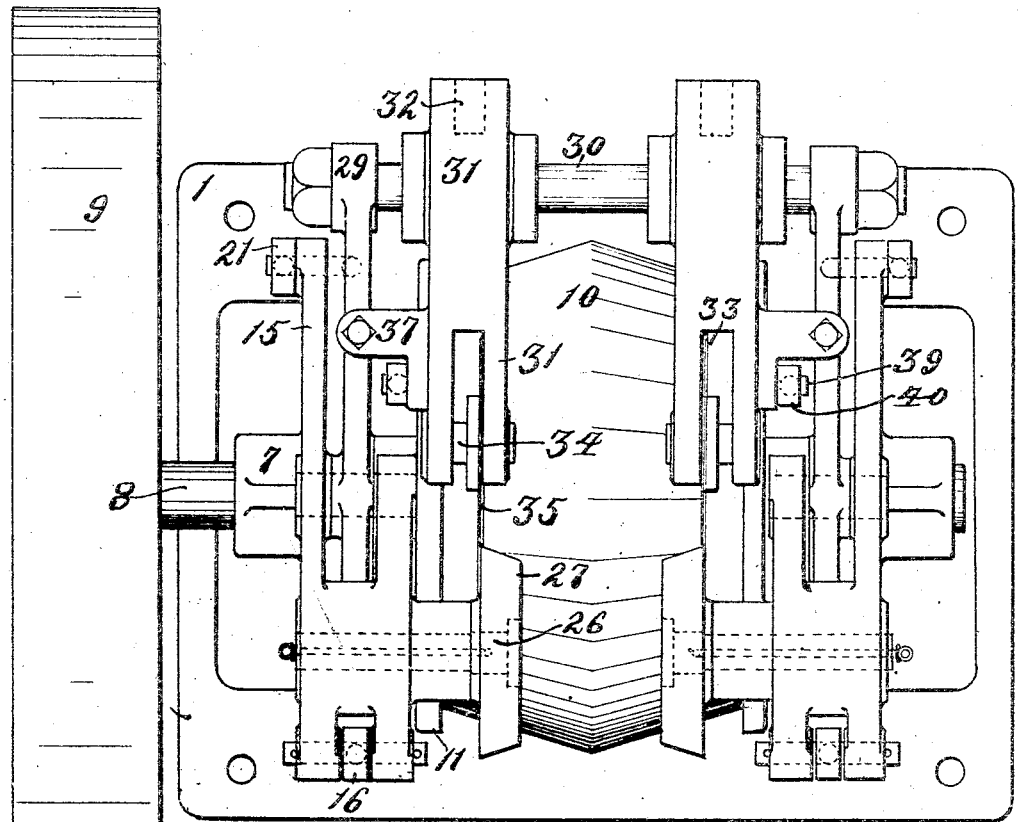
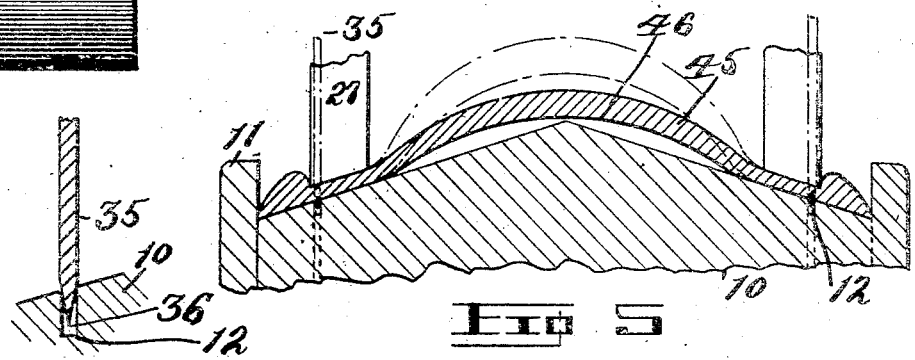
Witnesses
Jas. L. Butter.
G. L. McClintock
Inventor
John F. Johnston
C. E. Humphrey
By
Attorney

UNITED STATES PATENT OFFICE.

JOHN F. JOHNSTON, OF CUYAHOGA FALLS, OHIO, ASSIGNOR TO THE ELECTRIC RUBBER RECLAIMING COMPANY, OF BARBERTON, OHIO, A CORPORATION OF OHIO.

TRIMMING DEVICE.

1,121,924.  Specification of Letters Patent.  Patented Dec. 22, 1914.

Application filed May 4, 1914.   Serial No. 836,177.

*To all whom it may concern:*

Be it known that I, JOHN F. JOHNSTON, a citizen of the United States, residing at Cuyahoga Falls, in the county of Summit and State of Ohio, have invented new and useful Improvements in Trimming Devices, of which the following is a specification.

This invention relates to trimming devices, more especially trimming devices for trimming the lateral beads from tire carcasses or shoes.

Briefly, the valuable rubber in worn-out tire carcasses and shoes is reclaimed by devulcanizing it or reclaiming it, but previous to being used for this purpose it becomes necessary to trim the lateral beads from the tire carcass to remove the hard portions of the beads which frequently contain metal bands or wire, the reclaiming of these portions of tire carcasses or shoes being unprofitable.

The object of the invention is to provide a machine which will quickly and evenly trim the beads from tire-shoes or carcasses of any size without any preliminary regulating, so that the machine will not need to be readjusted for different sizes of shoes.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a view in front elevation of a device embodying this invention; Fig. 2 is a view in side elevation; Fig. 3 is a plan; Fig. 4 is an enlarged detail of the shearing knife, and its receiving groove, on the supporting drum; and, Fig. 5 is a detail enlarged of the pressure rolls and trimming means in operative relation with respect to a tire carcass or shoe.

In the drawings the reference numeral 1 denotes a table 1 supported by a pair of housings 2 each provided with upright legs 3 and 4 respectively. Mounted on the table 1 are a pair of housings 5 and 6 with bearings 7 for a driving shaft 8 which bears a belt pulley 9 by which rotation of the shaft is secured. The housings 5 and 6 are spaced from one another and mounted on the shaft 8 between them is a drum 10 the transverse medial diameter of which is greater than the diameter of the side edges which are provided with flanges 11. The portions of the periphery of the drum 10 on opposite sides of the transverse median line constitute conic-frusta. The peripheral surface of the drum is provided with a pair of circumferentially-extending grooves 12. Positioned above the bearings 7 in the housings 5 and 6 are a pair of alined bearings 13 and in each of these bearings is mounted a stud 14. Pivotally mounted on each of the studs 14 are rocking arms 15 to one end of each of which is pivotally connected an upwardly-extending rod 16 which passes through a suitable aperture in the table 1 and is provided near its lower end with a collar 17 below which is an adjusting nut 18 and a locking nut 19. Between the collar 17 and the under face of the table 1 each rod 16 bears a coiled spring 20 the normal tendency of which is to force its respective rod downwardly. To the opposite end of each rocking arm 15 is pivotally connected an upwardly-extending rod 21 which passes downwardly through a suitable aperture in the table 1 and is pivotally connected at the point 22 with a foot lever 23 pivoted on a shaft 24 mounted in suitable bearings 25 on the supporting legs 4.

Each of the rocking arms 15 bears at a point between the bearing 13 and the pivotal connection of the upper end of the rod 16 thereof a stud 26 on which is mounted a pressure roller 27 the peripheral face of which is parallel with the peripheral face of one side of the drum 10. These rollers 27 are so positioned with respect to the drum 10 that their outer faces are in substantial alinement with the grooves 12. Extending upwardly and to the right in Fig. 2 and integral respectively with each of the housings 5 and 6 are brackets 28 provided near their upper outer ends with bearings 29 in which bearings is mounted a transversely-extending shaft 30. Fixedly mounted on the shaft 30 are a pair of knife-carrying arms 31 provided in their right ends in Fig. 2 with sockets 32 for a purpose to be described, and at their opposite ends with slots 33 so that these latter ends are forked. Extending across the separate and forked ends of the members 31 are shafts 34 on which are mounted disk-shaped cutting knives 35 the cutting edges of which are fashioned somewhat as shown in Fig. 4 so as to be received in the grooves 12. The thickened portions of the disks are adapted to engage the edges of the grooves 12 so that the sharpened cutting edges 36 are held from contact with the inner walls of the grooves 12 which prevent dulling of their cutting edges. Each of the members 31 is provided with a laterally-extending lug 37 bearing an adjusting set-screw 38 the lower end of which is adapted to contact with one bracket 28 and limit the downward movement of the member 31. Pivotally connected with studs 39 on the lugs 37 are upwardly-extending rods 40 which pass downwardly through suitable apertures in the table 1 and below the table 1 each rod bears a collar 41 below which is an adjusting nut 42 held in position by a lock nut 43 and between each of the collars 41 and the under face of the table 1 are coiled springs 44 the normal tendency of which is to draw the rods 40 and the members 31 downwardly to constantly hold the knives 35 in the grooves 12.

In operation, the tire shoes or carcasses 45 are first cut transversely and are straightened out and are fed to the drum with the inner faces 46 in approximate contacting engagement with the outer face of the drum 10. The distance between the inner opposing faces of the flanges 11 is such that when the tire shoe or carcass of the smallest commercial size is placed on the drum the edges of the lateral beads thereof will just contact with the opposing faces of the flanges and the balance of the carcass will lie approximately on the face of the drum as is shown in full lines in Fig. 5. When a tire shoe or carcass of greater size is to be trimmed, the median portion or tread of the tire-shoe or carcass will bulge upwardly as is shown in dotted lines in Fig. 5, so, as before stated, it will be seen that the device is adaptable without any preliminary adjustment to trim any known size of tire carcass. Should it be necessary at any time to raise the knives 35 out of the grooves 12, a bar or other suitable instrumentality may be inserted in one of the sockets 32 and by downward movement of the lever the opposite ends of the members 31 bearing the knives are raised. In feeding the severed ends of the tire-carcasses or shoes to the device, the operator presses down the foot treadle 23 which raises the feed or pressure rollers 27 upwardly from the face of the drum, and after placing the end of the carcass under these rollers 6, pressure on the treadle is released, allowing the springs 20 to draw the pressure rollers 27 downwardly onto the carcass and hold it firmly on the face of the drum and in frictional engagement with the peripheral portion thereof, and with the edges thereof contacting the opposing inner faces of the flanges. As before noted, the knife edge 36 extends inwardly into the receiving grooves 12 and the engagement with the edges of said grooves sets up a shearing function combined with the cutting function of the sharpened edge so as to combine both a knife and a pair of rotary shear-forming elements for trimming the hardened beads from the edges of the carcass. The lower or operative position of the cutting knives 35 may be regulated through the medium of the adjusting screws 38 which constitute stops therefor.

I claim:—

1. A device of the class described comprising a rotatable drum the peripheral face of which is provided with a circumferential groove and further provided at the sides thereof with radial flanges, means to revolve said drum, a pressure roller engaging the work on said drum near said peripheral groove, and a cutting knife engaging the work on said drum and coöperating with said groove during the cutting operation.

2. A device of the class described comprising a rotatable drum provided in the peripheral face thereof with a circumferential groove, said drum further provided at the side thereof with a projecting flange constituting a guide and an abutment for the edge of the work to be trimmed, a pressure roll engaging the work on said drum near said peripheral groove, means to hold said pressure roll in its operative position, a cutting knife engaging the work on said drum and coöperating with said peripheral groove for the trimming operation.

3. A device of the class described comprising a rotatable drum provided in the peripheral face thereof with a circumferential groove, said drum further provided at the side thereof with a projecting flange constituting a guide and an abutment for the edge of the work to be trimmed, a pressure roll engaging the work on said drum near said peripheral groove, means to hold said pressure roll in its operative position, a cutting knife engaging the work on said drum and coöperating with said peripheral groove for the trimming operation, and means for holding said knife in its operative position.

4. A device of the class described comprising a rotatable drum provided in the outer face thereof with a peripheral groove and at the side with a lateral flange, said flange constituting an abutment and guide for the work on said drum, a pressure roll engaging the work on said drum near said peripheral groove, means to hold said pressure roll in its operative position, means for shifting said pressure roll to its inoperative position, a cutting knife coöperating with said peripheral groove during the trimming operation, and means to hold said trimming knife in its operative position.

5. A device of the class described comprising a supporting frame, a rotatably mounted drum carried by said frame, the peripheral face of said drum being provided with a groove, a flange at the side of said drum constituting a guide and an abutment, a rocking arm carried by said frame, a pressure roll on said rocking arm, means to force said pressure roll to its operative position in engagement with the work on said drum, means for shifting the position of said pressure roll to its inoperative position, a second rocking arm carried by said frame, a cutting knife carried by said rocking arm coöperating with the groove in said drum for the cutting operation, means to hold said cutting knife in its operative position.

In testimony whereof I have hereunto set my hand in presence of two subscribing witnesses.

JOHN F. JOHNSTON.

Witnesses:
  C. E. HUMPHREY,
  A. L. MCCLINTOCK.